United States Patent [19]

Hallinan et al.

[11] Patent Number: 5,308,380
[45] Date of Patent: May 3, 1994

[54] MIC OXYGENATION: "EXTRACTION OF METALS VALUES FROM METALS BEARING ORES"

[75] Inventors: Mark S. Hallinan; Anthony R. Stephens, both of Johannesburg, South Africa

[73] Assignee: African Oxygen Limited, Johannesburg, South Africa

[21] Appl. No.: 895,298
[22] Filed: Jun. 8, 1992

[30] Foreign Application Priority Data

Jun. 6, 1991 [ZA] South Africa .................. 91/4338

[51] Int. Cl.$^5$ .................. C22B 3/12; C22B 3/02
[52] U.S. Cl. .................. 75/744; 266/101; 423/29
[58] Field of Search .................. 423/29; 75/744; 266/101

[56] References Cited

U.S. PATENT DOCUMENTS 5,071,477  12/1991  Thomas et al. .................. 423/29

Primary Examiner—Melvyn J. Andrews
Attorney, Agent, or Firm—Larry R. Cassett

[57] ABSTRACT

This invention relates to the extraction of metal values from metal bearing ores. More particularly, in a process for recovering metal values from metal bearing ore, the invention provides the step of enhancing metal value recovery by introducing into the thickener overflow water 32, a gaseous agent capable of promoting recovery of the metal values from the ore. The gaseous agent may be oxygen or oxygen enriched gas, and can be injected by means of injection means 50.

19 Claims, 1 Drawing Sheet

MIC OXYGENATION: "EXTRACTION OF METALS VALUES FROM METALS BEARING ORES"

TECHNICAL FIELD

THIS INVENTION relates to the extraction of metal values from metal-bearing ore.

BACKGROUND OF THE PRIOR ART

The Applicant is aware of a process for extracting metal values from metal bearing ores which comprises, in a milling stage, milling wetted ore to produce a slurry; adding a lixiviant to the slurry from the milling stage; passing the slurry to a leaching stage where the lixiviant leaches metal from the ores, with the metal thus being dissolved in the lixiviant; passing the leached slurry to a carbon-in-pulp ('CIP') absorption section where the slurry is contacted with activated carbon particles which absorb the metal from the lixiviant; separating the carbon particles from the residual slurry; and, in a metal recovery section, recovering the metal from the carbon particles. Instead of the separate leaching and absorption stages, a combined leaching and carbon absorption ('CIL') stage can be provided.

The slurry from the milling stage is introduced into at least one slurry thickener where the slurry is thickened by removing water therefrom with this water being removed as a thickener overflow water stream. This water can either be returned to the milling stage, or it can be used in a slime dam gold recovery operation, or it can be used for gold recovery from a spent gold ore dump. Such a process is hereinafter also referred to as a 'process of the kind described'.

SUMMARY OF THE INVENTION

According to the invention, there is provided, in a process of the kind described, a method of enhancing metal value recovery, which comprises introducing into the thickener overflow water, a gaseous agent capable of promoting recovery of the metal values from the ore.

The metal may be a noble metal, in particular gold, so that the ore is gold-bearing ore, and the lixiviant may be a cyanide-based substance such as an alkali metal cyanide, e.g. calcium or sodium cyanide. The gaseous agent may then be oxygen or an oxygen-enriched gas.

The process may include at least one mill in which the pulp or slurry is produced; a pulp conduit or flow line leading from the mill to at least one thickener for thickening the slurry by separating it into a thickener slurry fraction and an overflow water fraction; a thickened slurry conduit leading from the thickener to the leaching stage; and an overflow water conduit leading from the thickener.

In one embodiment of the invention, the overflow water conduit may lead back to the mill, so that it constitutes a mill return water conduit. However, in other embodiments of the invention, it may lead to a slimes dam gold recovery operation or to a spent ore gold dump gold recovery operation. However, a combination of these embodiments may be present, if desired.

Sufficient gas may be introduced into the water to ensure that the dissolved oxygen levels in the slurry are maintained at values higher than the saturation level of oxygen in slurry open to the atmosphere. The gas may be injected into the conduit. The injection rate may be between 0.1 and 0.2 kg oxygen per tonne of ore milled.

BRIEF DESCRIPTION OF THE DRAWINGS

The invention will now be described by way of example with reference to the accompanying diagrammatic drawings.

In the drawings.

DETAILED DESCRIPTION OF THE INVENTION

Figure 1:
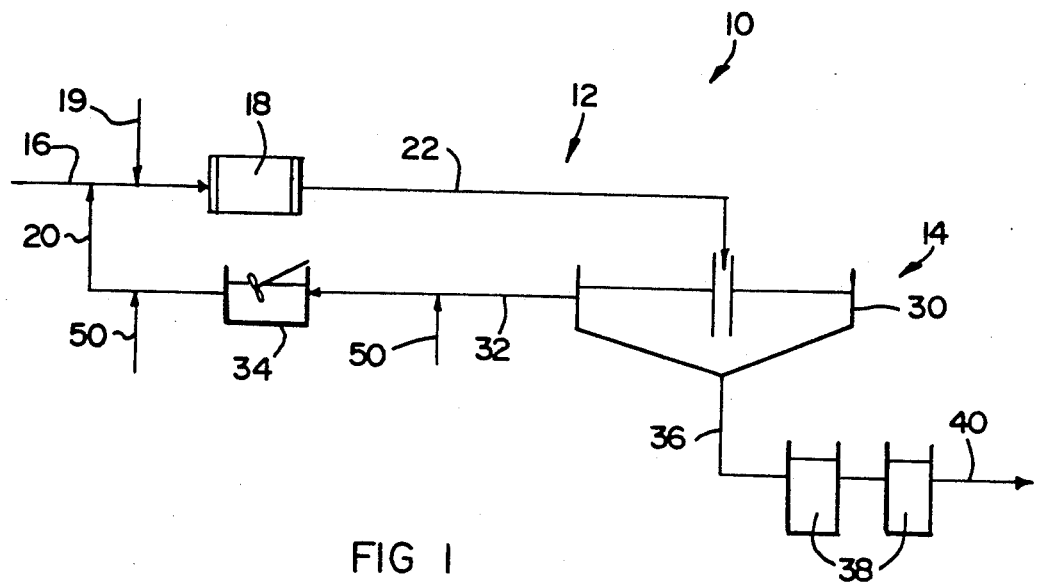
FIG. 1 shows a simplified flow diagram of a process for extracting gold from gold-bearing ore, in accordance with a first embodiment of the invention.

Referring to FIG. 1, reference numeral 10 generally indicates a process for extracting gold from gold-bearing ore, in accordance with a first embodiment of the invention.

The invention 10 includes a first stage, generally indicated by reference numeral 12, as well as a second stage, generally indicated by reference numeral 14.

In the first stage 12, gold-bearing ore is fed, typically at a rate of 10–100 tonnes per hour dry solids, via a flow line or conduit 16 into a mill 18, together with mill return water, described in more detail hereunder, which enters the conduit 16 via a conduit 20. Make-up water enters the conduit 16 along a conduit 19. In the mill 18 the ore is ground down in the presence of the water until approximately 80% of the ore has a particle size of less than 75 microns. A slurry or pulp comprising the milled ore and water is hence formed in the mill 18.

The pulp passes from the mill 18, along a conduit or flow line 22, into a thickener 30. In the thickener 30, the slurry fraction or pulp is thickened, typically to about 50% by mass. Water is withdrawn from the thickener 30 via a flow line or conduit 32, which leads to a holding tank 34. Water from the holding tank 34, is then returned as mill return water, along the conduit 20, to the mill 18.

In certain applications, calcium cyanide can, if desired, be added to the mill return water. It may then be added as a calcium cyanide make-up solution together with lime, to the holding tank 34. In such applications, calcium cyanide will thus be introduced into the milled ore or pulp via the mill return water. Sufficient calcium cyanide can then be added so that the cyanide concentration in the milled ore or pulp is maintained at about 100–400 ppm (by mass).

Thickened slime or pulp produced in the thickener 30 passes along a flow line 36 to pachuca vessels or tanks 38, for leaching and thereafter, along a flow line 40, to further recovery of the gold from the lixiviant. The pachucas 38 hence form part of the second or gold recovery stage 14 in which leaching of gold values from the ore, separation of lixiviant from the ore, and recovery of the gold values from the lixiviant, are effected in known manner. For example, in the pachucas 38, calcium cyanide and lime can be added for recovery of gold values from the thickened slime in known fashion. If desired, oxygen can also be introduced into the pachucas 38 to enhance gold recovery, e.g. by means of air agitation or induced air with mechanical agitation or pure oxygen injection.

The process 10 also includes at least one injection means 50 leading into the conduit 32 and/or the conduit 20, for injecting air or oxygen into these conduits. For example, one or more injection means 50 can be provided in each of the conduits 32 and 20.

By injecting air or oxygen via the injection means 50, higher dissolved oxygen levels in the milled pulp is obtained. The Applicant believes that this will lead to increased gold value recoveries due to more complete gold dissolution in the cyanide lixiviant being effected, particularly if the process or plant 10 is running at greater than design throughputs, or if the plant throughput is to be increased.

Oxygen in the pulp is also consumed by unoxidized minerals and organics in the milled pulp. In their unoxidized state, these species react with calcium cyanide, rendering it unavailable for gold dissolution. Excess calcium cyanide must hence be added to the pulp to compensate for this, leading to increased cyanide consumption. The oxygen injection, it is believed, will hence also result in a decrease in cyanide consumption.

The oxygen injection means 50 and their points of introduction into the conduits are preferably selected that the oxygen can be introduced into the conduits in turbulent zones and under pressure, since pressurized oxygen injection will enhance oxygen dissolution in the water, while turbulent flow conditions will ensure that the gaseous bubbles of oxygen are well dispersed in the fluid in the conduits. The injection means should also be located at such a position that there is sufficient residence time in the process downstream of the injection means to allow the oxygen to dissolve before it can escape to the atmosphere, e.g. in the thickener 30.

Furthermore, by increasing the oxygen levels in the slurry by the oxygen injection arrangements, the reaction of gold with the calcium cyanide as hereinbefore described, takes place at a faster rate so that, apart from being able to increase plant throughput as hereinbefore described, the residence time of the gold in the process can be reduced. This has the advantage that the contact time of the carbonaceous material with the gold is reduced, lessening the re-absorption of the gold onto the carbonaceous material, thereby also enhancing gold recovery, i.e. rendering it more efficient.

A further advantage of the oxygen injection provided by the present invention is that gold-bearing ores also contain iron pyrites minerals which also react with cyanide, i.e. consume calcium cyanide. Oxygen oxidizes these minerals to form iron hydroxides, which form as a cyanide-immune layer on the iron pyrites particles, thereby also reducing potassium cyanide consumption.

With the oxygen injection in accordance with the present invention, it is thus believed that formation of small oxygen bubbles in the pipelines is promoted, resulting in high oxygen transfer efficiencies, leading to optimized oxygen usage with accompanying cost benefits. An additional benefit may be the reduction in oxygen demand in the leaching stage, due to the increased or higher oxygen levels in the feed slurry, which are, as described, obtainable with the present invention.

In one embodiment of the invention, the injection means 50 may each comprise a sonic nozzle by means of which oxygen at a pressure of 300-500 kPa is released, through a nozzle at a velocity approaching the speed of sound, into the conduit carrying the slurry or water. The zone of injection is then preferably at an elbow in the conduit so that fluid turbulence is maximized and, as mentioned above, a sufficient distance from the next downstream vessel which is open to atmosphere, to allow the oxygen to dissolve. Ideally, the velocity of the fluid in the conduit should be between 2 and 5 meters per second for good dispersion of the oxygen bubbles. For example, the injection means may then be that available under the trade name PRIMOX.

In another embodiment of the invention, the injection means may be a so-called VITOX (trade name) arrangement or system in which all or a portion of the fluid flowing along the conduit is pumped through a venturi. Oxygen or air is injected under pressure into the slurry at the venturi. The venturi creates a dispersion of bubbles in its downstream branch thereof, i.e. in its VITOX pipe. The oxygenated or aerated fluid thus formed is sparged back into the conduit through high velocity nozzles. These nozzles serve to further reduce the size of undissolved gas bubbles, and create areas of high turbulence which help to dissolve the oxygen.

In yet another embodiment of the invention, the injection may be by means of an in-line mixer, typically comprising a plurality of baffle plates in the conduit.

Preferably, sufficient oxygen is injected so that dissolved oxygen levels in the slurry in the conduit 28 are maintained above saturation level of oxygen in slurry at a point where the slurry is open to atmosphere, e.g. in the thickener 30. The actual rate of oxygen injection will hence depend on the efficiency of dissolution, the oxygen consumption by the slurry, and the oxygen saturation levels in the slurry, but typically the injection rates can be 0.1 to 0.2 kg of oxygen per tonne of ore milled.

Typically, 60-70% by mass of the total gold content of the ore entering the stage 12 is extracted in the stage 12, with a further about 25% by mass typically being extracted in the stage 14, to give a combined or total extraction of about 85-95% by mass. With the process of the present invention, the Applicant believes that the gold extraction in the stage 12 can be increased.

Figure 2:
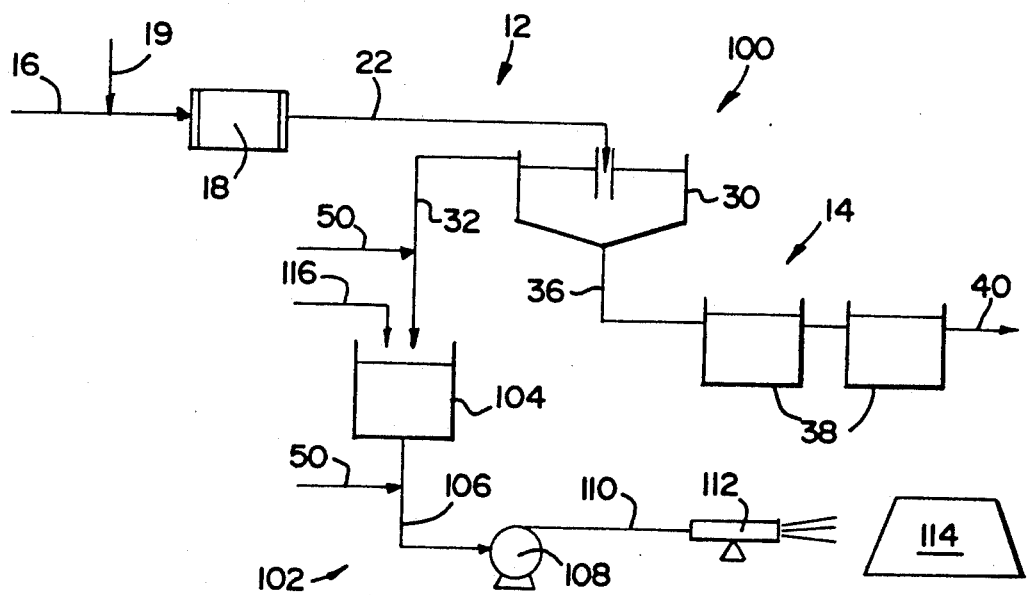
FIG. 2 shows a simplified flow diagram of a process for extracting gold from gold-bearing ore, in accordance with a second embodiment of the invention.

Referring to FIG. 2, reference numeral 100 generally indicates a process for extracting gold from gold-bearing ore, in accordance with a second embodiment of the invention.

Parts of the process 100 which are the same or similar to those of the process 10, are indicated with the same reference numerals.

The process 100 includes a gold recovery stage 102. In the stage 102, the thickener overflow water conduit 32 leads from the thickener 30 into a holding tank 104. A conduit 106 leads from the holding tank 104 to a high pressure water pump 108, while a conduit 110 leads from the pump to a high pressure water gun or monitor 112 which directs high pressure water onto a spent ore dump 114 from which residual gold is recovered in known fashion.

At least one of the oxygen injection means 50 leads into each of the conduits 32, 106 while an oxygen-sparging arrangement 116 can lead into the tank 104, if desired, to aid in increasing the dissolved oxygen level in the water.

We claim:

1. A process for extracting metal values from metal bearing ores, which comprises:
   (a) milling wetted ore to produce a slurry;
   (b) removing water from the slurry to produce a thickened slurry of low water content and a water overflow component;
   (c) adding a lixiviant to the thickened slurry;
   (d) leaching metal from the thickened slurry such that the metal is dissolved in the lixiviant to form a leached slurry;

(e) absorbing the leached slurry in a carbon-in-pulp absorption section via contact with activated carbon particles which absorb the metal from the lixiviant to form a residual slurry;

(f) separating the carbon particles from the residual slurry; and (g) recovering the metal from the carbon particles;

wherein the improvement comprises introducing a gaseous agent into the water overflow component, where at least a portion of the water overflow component is recycled to the milling stage for wetting of the ore, which agent is capable of promoting recovery of the metal values from the ore.

2. The process of claim 1 wherein the metal is a noble metal.

3. The process of claim 2, wherein the noble metal is gold.

4. The process of claim 1, wherein the lixiviant is cyanide-based.

5. The process of claim 4, wherein the cyanide-based lixiviant is calcium cyanide or sodium cyanide.

6. The process of claim 5, wherein calcium cyanide is added to obtain a concentration of about 200 ppm by mass.

7. The process of claim 1, wherein the gaseous agent is oxygen or an oxygen-containing gas thereby dissolving oxygen in the water overflow component.

8. The process of claim 7, wherein a sufficient amount of the gaseous agent is introduced collectively to the process to ensure that the dissolved oxygen levels in the slurry are maintained at values higher than the saturation level of oxygen in a slurry opened to the atmosphere.

9. The process of claim 7, wherein the amount of the gaseous agent provides between 0.1 and 0.2 kilograms oxygen per ton of ore.

10. The process of claim 1, wherein the slurry is thickened to about 50% by mass.

11. The process of claim 1, wherein the water overflow component is used in one or more of the following ways: (i) returned to the milling state; (ii) transferred to process for slime dam gold recovery; (iii) transferred to process for gold recovery from a spent gold ore damp.

12. The process of claim 11, wherein calcium cyanide is added to the water overflow component returned to the milling stage.

13. The process of claim 12, wherein calcium cyanide is added to the water overflow component to maintain a concentration of about 100–400 ppm by mass.

14. The process of claim 1, wherein the gaseous agent is oxygen or an oxygen-containing gas, said process comprising adding the gaseous agent to the leaching stage via either air agitation or induced air with mechanical agitation or pure oxygen injection.

15. The process of claim 7, wherein the oxygen or oxygen-containing gas is injected via an oxygen injecting device, which device comprises a sonic nozzle with a release pressure of 300–500 kPa and at a velocity approaching the speed of sound.

16. The process of claim 7, wherein the oxygen or oxygen-containing gas is injected such that fluid turbulence is maximized and at sufficient distance from the next downstream vessel which is open to the atmosphere to allow the oxygen to dissolve.

17. The process of claim 15, wherein the velocity of the water overflow component is between 2 and 5 meters per second.

18. The process of claim 7, wherein the gaseous agent is injected via an in-line mixer, comprising a plurality of baffle plates in the conduit.

19. An apparatus for extracting metal values from metal bearing ores, which comprises:

(a) a mill for wetted ore to produce a slurry;

(b) means for removing water from the slurry to produce a thickened slurry of low water content and a water overflow component, which may be returned to the mill;

(c) means for adding lixiviant to the thickened slurry;

(d) a metal leacher for the thickened slurry such that the metal is dissolved in the lixiviant to form a leached slurry;

(e) an absorber for the leached slurry with a carbon-in-pulp absorption section which contacts the slurry to activated carbon particles, thereby absorbing the metal from the lixiviant to form a residual slurry;

(f) a separator to remove the carbon particles with metal from the residual slurry; and (g) recovery means for removing the metal from the carbon particles;

wherein the improvement comprises means for introducing a gaseous agent into the water overflow component, where at least a portion of the water overflow component is recycled to the milling stage for wetting of the ore, which gaseous agent is capable of promoting recovery of the metal values from the ore, wherein the metal is gold, the lixiviant is calcium cyanide, and the gaseous agent is oxygen or an oxygen-containing gas.

* * * * *